United States Patent [19]

Hutter, III et al.

[11] Patent Number: 4,813,368
[45] Date of Patent: Mar. 21, 1989

[54] MUSICAL TEA KETTLE

[75] Inventors: Charles G. Hutter, III, Carson City; Raymond R. Hill, Stagecoach, both of Nev.

[73] Assignee: Physical Systems, Inc., Carson City, Nev.

[21] Appl. No.: 96,132

[22] Filed: Sep. 14, 1987

[51] Int. Cl.⁴ .............................................. G10K 9/22
[52] U.S. Cl. ..................................... 116/67 R; 116/70; 116/137 R; 126/388; 84/95.2
[58] Field of Search .............. 116/67 R, 70, 101, 102, 116/103, 137; 126/388, 392; 340/626, 692; 84/1.03, 95.2, 419, 411 A, 94, 94.1, 94.2, 95.1, 95.2; 219/438, 441, 442, 437; 236/92 C; 307/117

[56] References Cited

U.S. PATENT DOCUMENTS

| 2,632,419 | 3/1953 | Topping | 116/70 |
| 3,811,400 | 5/1974 | Smilg | 116/70 |
| 3,916,818 | 11/1975 | Barr et al. | 126/388 X |
| 4,000,715 | 1/1977 | Warnod | 116/137 R |
| 4,155,349 | 5/1979 | Hudson | 126/388 |
| 4,466,327 | 8/1984 | Hinton | 84/95.2 |

Primary Examiner—William M. Shoop, Jr.
Assistant Examiner—Paul Ip
Attorney, Agent, or Firm—Kelly, Bauersfeld & Lowry

[57] ABSTRACT

A musical tea kettle is provided for playing a selected tune or the like when water within the kettle is heated to a boiling condition. The tea kettle includes a kettle body having an upper opening within which is mounted a steam driven whistle unit having a steam powered shuttle valve assembly for supplying steam to a plurality of steam whistles. When water within the kettle is boiled, the shuttle valve assembly drives a rotatable valve plate having valve ports therein for discharging steam to the plurality of steam whistles mounted on the shuttle valve assembly, wherein the valve ports are arranged in position and size to operate the steam whistles in a timed pattern to play the selected tune.

21 Claims, 8 Drawing Sheets

MUSICAL TEA KETTLE

BACKGROUND OF THE INVENTION

This invention relates generally to steam driven musical apparatus for playing a selected tune. More particularly, this invention relates to a relatively compact musical apparatus incorporated into a tea kettle or the like for playing a selected tune when water within the tea kettle is heated to boiling.

Traditional tea kettles are well known in the art for use in heating water or the like to be used, for example, in making tea or other beverages, etc. Such tea kettles include a kettle body for receiving a supply of water, wherein the kettle body is constructed from a material which will permit direct exposure to a source of heat. In many popular tea kettle configurations, the kettle body is maintained substantially closed while water therein is heated to a boiling condition to generate steam. The generated steam in turn operates a low pressure steam whistle to provide a audible signal indicating that the water has reached the boiling condition.

In many instances, modern tea kettles are provided as speciality or novelty products for occasional use during entertaining, etc. Accordingly, there exists a significant market for attractive tea kettles having unique aesthetic or functional characteristics in addition to general utility for boiling water and the like.

The present invention provides a specialized or novelty tea kettle construction designed to provide a distinctive audible indication when water therein is heated to boiling. In particular, the present invention provides a compact steam powered whistle unit for operating a group of steam whistles in a manner producing a selected musical tune.

SUMMARY OF THE INVENTION

In accordance with the invention, an improved tea kettle includes a multiported steam powered whistle unit designed to be operated by steam generated within the kettle to play a selected tune when water is boiled. The whistle unit includes a group of steam whistles of different pitch, in combination with a steam powered shuttle valve assembly for delivering generated steam to the whistle unit in a controlled, time-regulated pattern.

In the preferred form, the shuttle valve assembly of the whistle unit includes a rotatable valve plate having multiple valve ports for alignment with steam ports opening respectively into the individual steam whistles. The shuttle valve assembly rotates the valve plate in a manner moving the valve ports therein into timed registry with the steam ports, thereby producing the selected musical tune.

The steam powered shuttle valve assembly comprises a piston and cylinder which mutually reciprocate relative to the multiported valve plate. The piston and cylinder include respective sets of ratchet drive teeth which are reciprocated alternately into and away from engagement with driven teeth on the valve plate to rotate or index the valve plate in a timed succession of relatively small rotational steps, when water within the kettle is heated to boiling to produce steam. Such produced steam enters the shuttle valve assembly for operative association with a sleevelike shuttle valve. The shuttle valve cooperates with a combination of chambers and orifices within the valve assembly to reciprocate the piston and cylinder in alternating sequence toward and away from the valve plate.

The multiported valve plate has the plurality of valve ports formed therein at predetermined locations and having individually selected sizes in accordance with the musical tune to be played. The valve plate is supported for rotation at the underside of an upper housing for the shuttle valve assembly, wherein this upper housing has the plurality of steam ports formed therein in respective alignment the steam whistles mounted on the topside of the housing. The valve plate rotates its valve ports into alignment with the housing steam ports to permit steam passage from within the kettle into operating relation with the steam whistles, all in a timed sequence designed to play the desired tune. Pitch pipes forming portions of the respective steam whistles are angularly set to insure condensate drainage therefrom and thereby prevent condensate interference with steam whistle operation.

The entire steam whistle unit is conveniently provided as an integrated and compact assembly incorporated into a handle unit for the tea kettle. The handle unit supports the whistle unit in a position normally closing an upper opening in the kettle body to confine steam discharge to passage through the shuttle valve assembly and whistle unit in driving relation therewith. A spring-loaded lever mounted on the kettle body is manually movable to displace the whistle unit to an open position thereby permitting the kettle to be filled or emptied, as desired.

Other features and advantages of the present invention will become more apparent from the following detailed description, taken in conjunction with accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
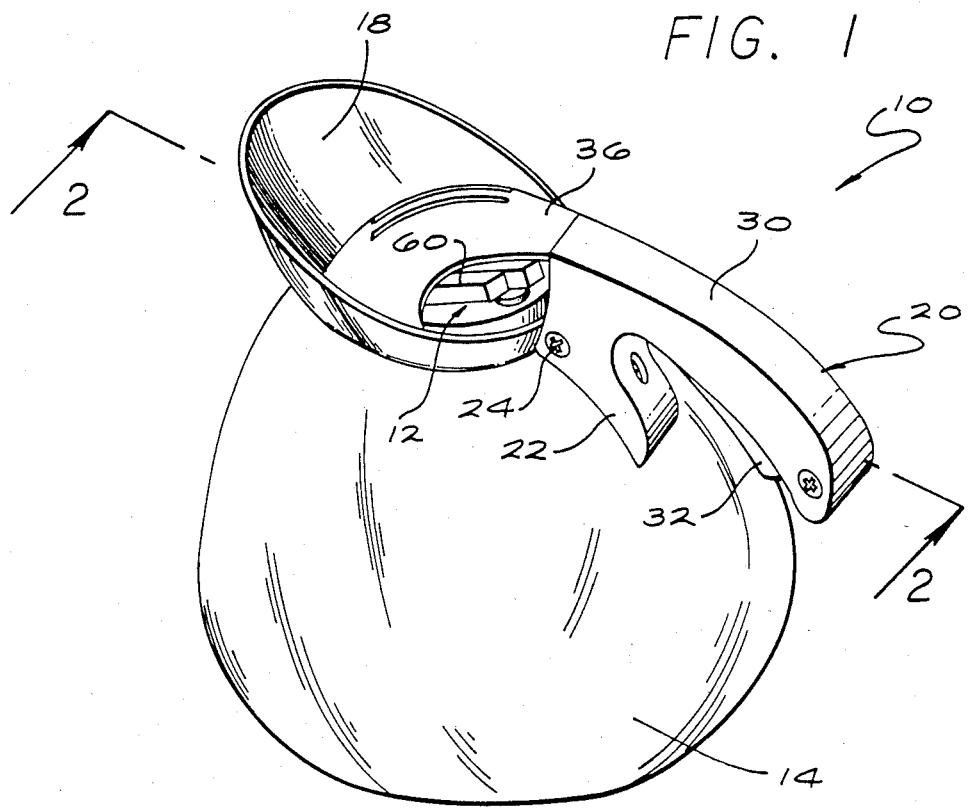
FIG. 1 is a perspective view illustrating a musical tea kettle embodying the novel features of the invention.

As shown in the exemplary drawings, a musical tea kettle referred to generally in FIG. 1 by the reference numeral 10 includes a steam powered whistle unit 12 for playing a predetermined combination of musical notes constituting a selected tune. The whistle unit 12 is mounted on the tea kettle 10 such that steam generated upon boiling of water within the kettle drives the whistle unit to play the selected tune. Accordingly, the whistle unit 12 provides a novelty audio signal indicating that the water within the kettle has reached the boiling condition.

Figure 2:
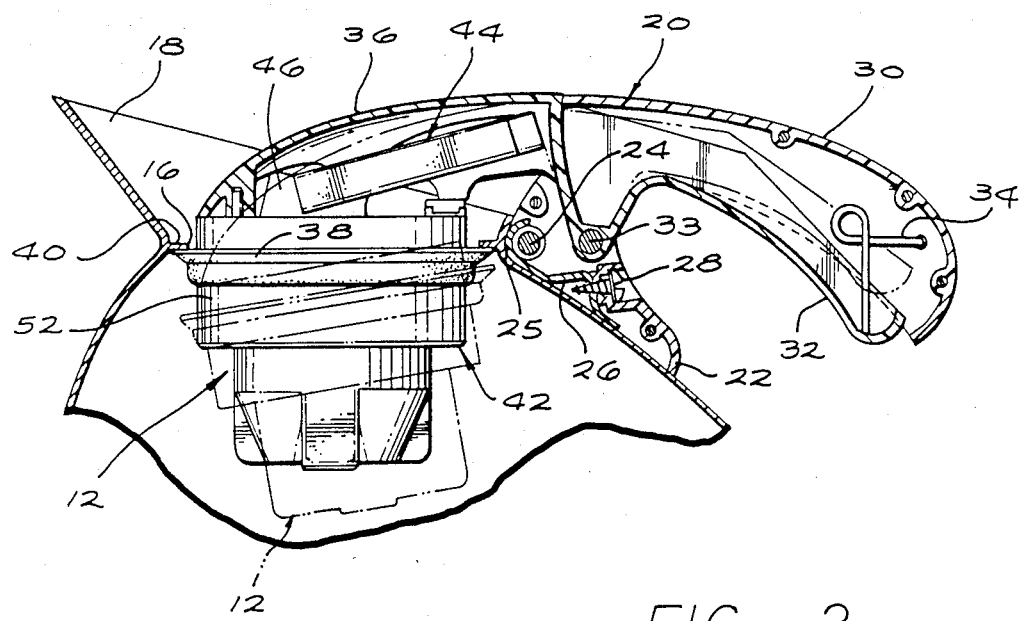
FIG. 2 is a fragmented vertical sectional view taken generally on the line 2—2 of FIG. 1 and showing a whistle unit mounted within an upper opening of the tea kettle.

As shown generally in FIGS. 1 and 2, the tea kettle 10 comprises a kettle body or pot 14 having an upper opening 16 into which water can be placed into or poured from the kettle. The kettle body 14 is constructed from an appropriate material such as stainless steel or the like capable of withstanding exposure to a suitable heat source for heating water within the kettle, all in a well known manner. A contoured pour spout 18 extends upwardly and outwardly from the kettle upper opening 16 to facilitate controlled pouring of heated water from the kettle.

The whistle unit 12 generally comprises a compact subassembly designed to be mounted generally within the kettle upper opening 16 (FIG. 2). In the preferred form, as shown in the exemplary drawings, the whistle unit is integrated into a handle unit 20 designed for convenient handling of the tea kettle 10 and manipulation of the whistle unit 12 to an out-of-the-way position during water ingress or egress with respect to the kettle interior.

More particularly, the handle unit 20 includes a contoured base 22 shaped to seat substantially flush against the exterior of the kettle body 14 in a position generally adjacent the upper opening 16. A transversely extending mounting stud 24 (FIG. 2) is carried by the base 22 in a position to seat within a generally U-shaped retainer 25 at one end of a mounting bracket 26 which is riveted or otherwise suitably secured to the kettle body 14. The U-shaped retainer 25 cooperates with a lock screw 28 fastened through the base 22 and secured into a portion of the bracket 26 to anchor the contoured base 22 securely upon the kettle body 14.

The contoured base 22 of the handle unit 20 extends generally in an upward direction adjacent the kettle upper opening 16 and then turns rearwardly away from the opening 16 to define an elongated and easily grasped handle member 30. As shown best in FIG. 2, this handle member 30 defines a downwardly open cavity for receiving a trigger lever 32 which is pivotally supported by a pivot pin 33 on the contoured base 22. A trigger spring 34 reacts between the handle member 30 and the trigger lever 32 for pivoting the trigger lever toward a normal position protruding partially from the underside of the handle member 30. In this normal position, a forward extension arm 36 protrudes forwardly from the trigger lever and is suitably connected to and supports the whistle unit 12 in a normal position generally obstructing or closing the kettle opening 16, as shown in solid lines in FIG. 2. A peripheral resilient seal 38 on the whistle unit 12 sealingly engages a circumferential lip 40 lining the kettle opening 16 when the whistle unit 12 is in this normal position to confine generated steam within the kettle for driving operation of the whistle unit, as will be described. However, when it is desired to fill the kettle with water or to pour heated water from the kettle, the trigger lever 32 can be retracted manually into the handle member 30 for pivoting the whistle unit 12 downwardly from the lip 40 toward the dotted line position shown in FIG. 2. Conveniently, in the preferred form, the handle member 30 and trigger lever 32 are formed from a selected plastic or other suitable material having appropriate heat insulating properties.

The whistle unit 12 comprises, in general terms, a lower shuttle valve assembly 42 and an upper whistle block 44 including a plurality of steam whistles for producing a respective plurality of different musical notes. When water within the kettle reaches a boiling condition, the shuttle valve assembly 42 is mechanically driven by steam pressure generated within the kettle to port the generated steam in a controlled and timed manner to the individual steam whistles for playing the selected tune. Accordingly, steam generated within the kettle by the boiling water powers the steam whistles as well as the shuttle valve mechanism for supplying steam to the steam whistles in a timed manner.

Figure 3:
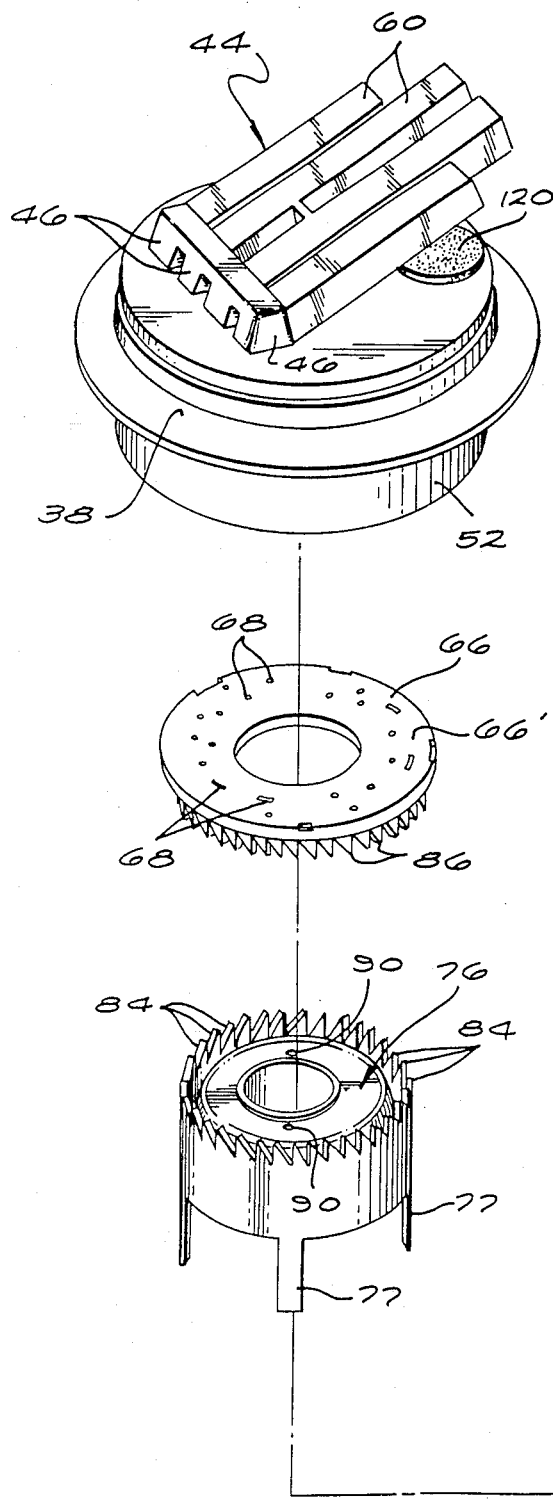
FIG. 3 an enlarged exploded perspective view illustrating assembly of components forming the whistle unit.
Figure 3:
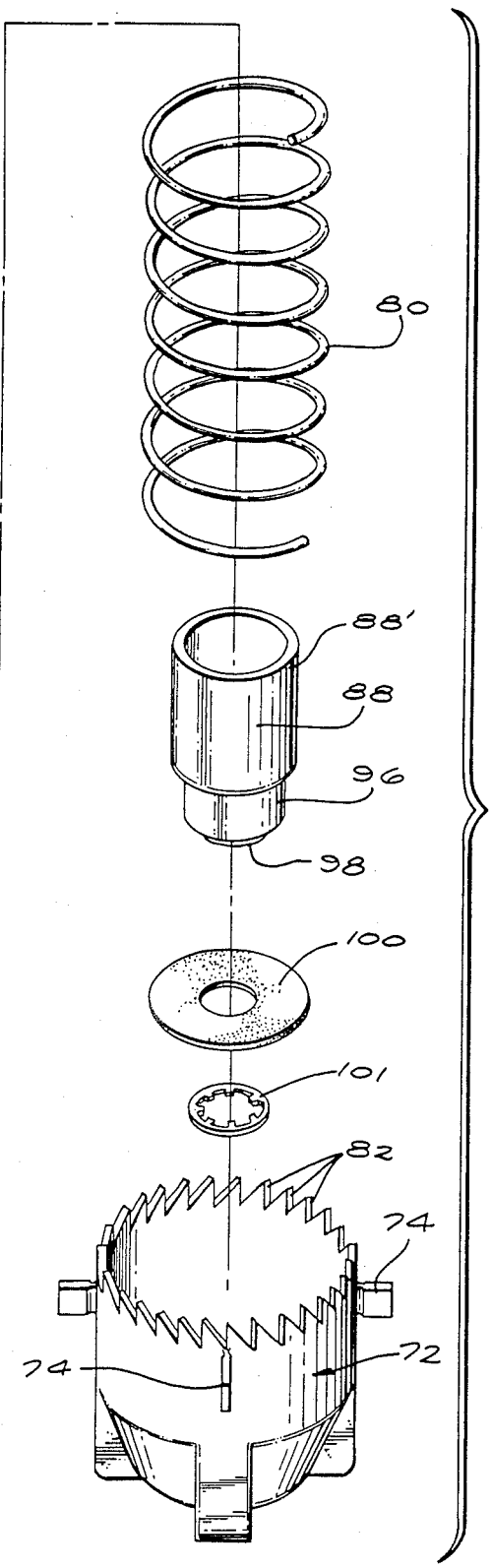
Figure 4:
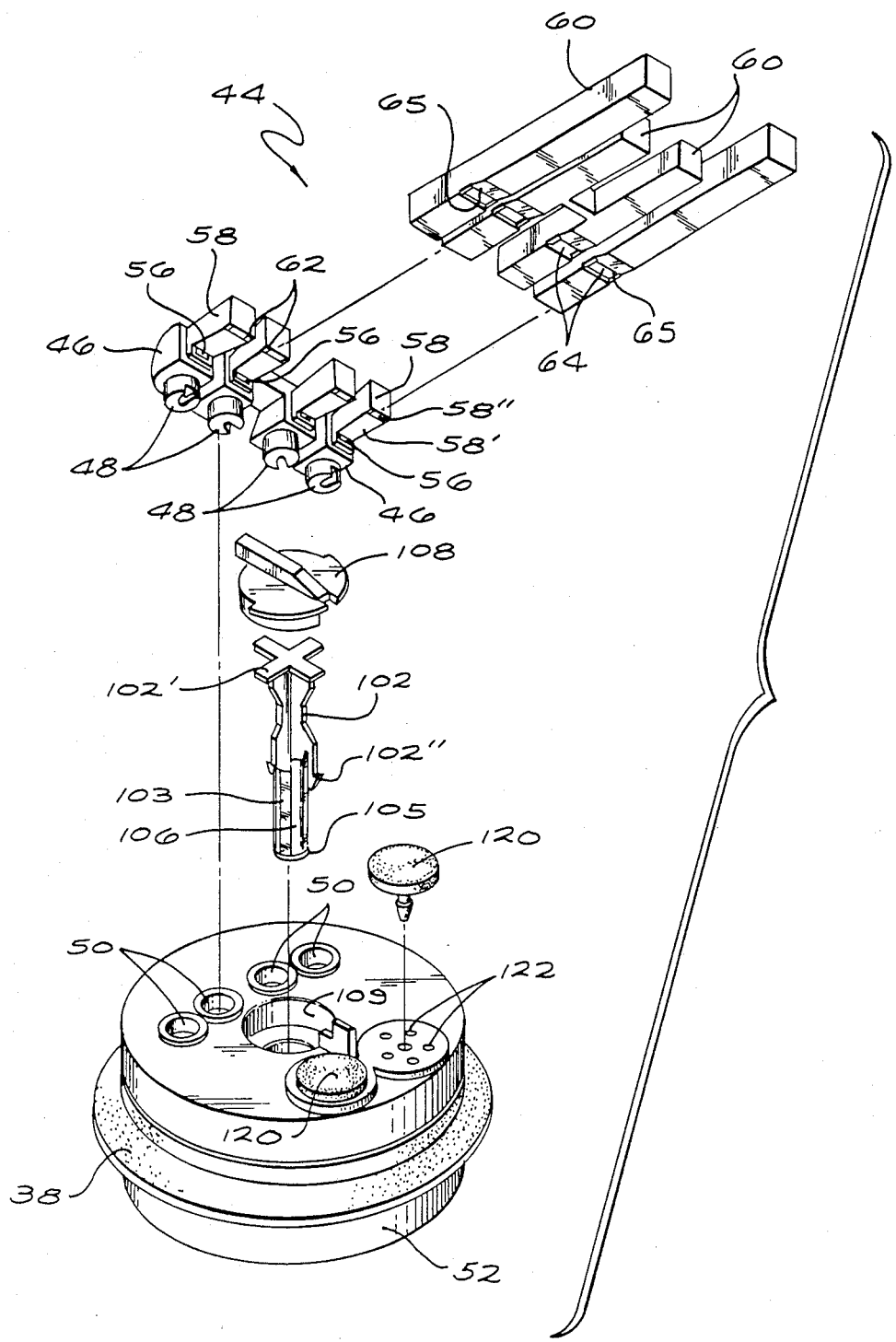
FIG. 4 is an exploded perspective view illustrating further assembly details with respect to steam whistles forming portions of the whistle unit.

More specifically, with reference to FIGS. 3 and 4, the whistle block 44 comprises a plurality of whistle bodies 46, four of which are shown in the exemplary drawings as a convenient unitary molding of plastic or the like. The whistle bodies 46 include downwardly projecting lower bosses 48 sized to seat respectively within an aligned row of shallow circular wells 50 formed in the topside of an inverted, generally cup-shaped upper housing 52. The peripheral seal 38 is mounted about this upper housing 52 for sealingly engaging the kettle lip 40, as previously described.

Each of the wells 50 in the upper housing 52 has a relatively small steam port 54 (FIG. 5) formed in the bottom wall thereof to permit upward passage of steam from the kettle interior to the individual whistle bodies 46. The whistle bodies 46 in turn include aligned internal passages 55 (FIG. 5) for guiding this steam flow upwardly and then generally horizontally for outward discharge through exit openings 56 (FIG. 4). These exit openings 56 are positioned to discharge the steam beneath short guide bars 58 having generally planar lower surfaces 58' which join in turn with upwardly angled planar trailing edges 58".

The guide bars 58 on the steam whistle bodies 46 provide supporting structures for reception into open lower ends of a corresponding plurality of generally rectangular pitch pipes 60. When installed, each pitch pipe 60 cooperates with the respective guide bar 58 for defining a narrow converging passage for steam flow from the whistle body as a thin film or sheet flowing between an interior surface of the pitch pipe and the angled trailing edge 58" of the guide bar. Short ridges 62 are conveniently provided on the guide bars 58 to maintain accurate spacing between these surfaces, thereby defining thin precision steam film passages. Steam flowing between these surfaces is exhausted into the elongated interior of the associated pitch pipe 60 adjacent a discharge port 64 defined in part by an angled trailing knife edge 65, whereby the steam film flows against this trailing edge to produce an audible whistle having a pitch in accordance with the overall size and shape, particularly length, of the pitch pipe. In this regard, it is noted that the four pitch pipes 60 associated with the four whistle bodies 46 have more than one length to produce musical whistle notes at different pitches. In addition, the pitch pipes 60 are oriented to extend angularly upwardly from their respective whistle bodies 46 so that any condensate produced therein will fall by gravity from the pitch pipe through the discharge ports 64 without interfering with whistle operation. While four pitch pipes 60 are shown in the illustrative drawings to play a four note tune, such as "Tea For Two," any number of such pitch pipes may be provided, as desired.

Figure 5:
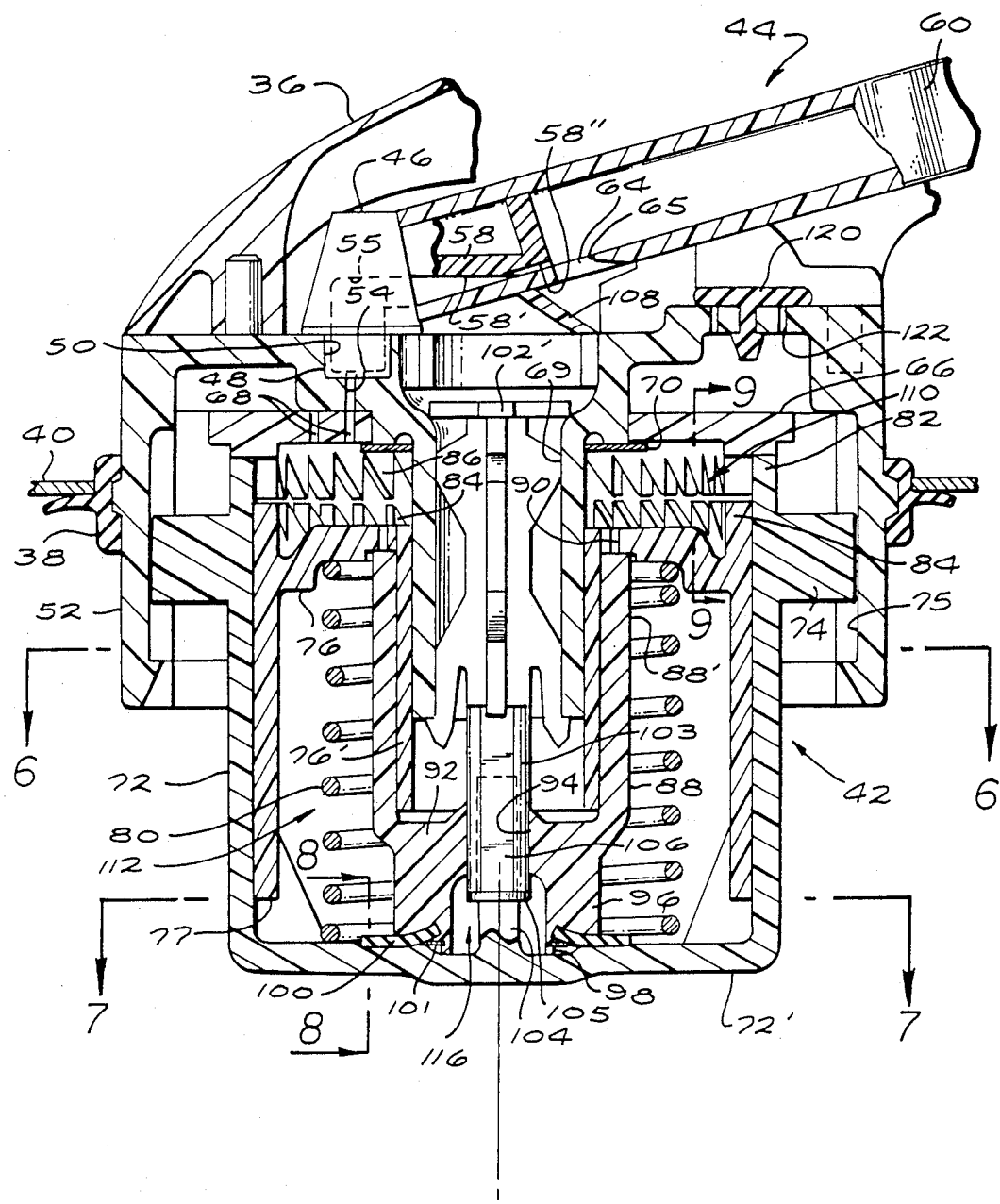
FIG. 5 is a further enlarged fragmented vertical sectional view of the whistle unit mounted at the top of the tea kettle.

Steam generated by boiling water within the kettle is supplied to the several steam whistles in a controlled and timed manner by a rotatable valve plate 66, as shown in FIGS. 3 and 5. This valve plate 66 is positioned within the cup-shaped housing 52 immediately underlying the steam ports 54. The valve plate 66 has a generally annular configuration and has a plurality of valve ports 68 formed therein at selected different radial positions and having selected different arcuate lengths. These valve ports 68 are arranged to rotate in a predetermined and pretimed fashion into alignment with the housing steam ports 54 to permit steam to discharge upwardly into the whistle bodies 46 in a manner playing the selected tune. In this regard, the valve plate 66 is defined by a substantially planar upper surface 66' (FIG. 3) to fit substantially flush against the housing underside. The valve plate 66 rotates about a central guide tube 69 (FIG. 5) projecting downwardly within the upper housing 52, and a retaining ring 70 or the like is provided to retain the valve plate 66 in this axial position for relatively free rotation.

Figure 6:
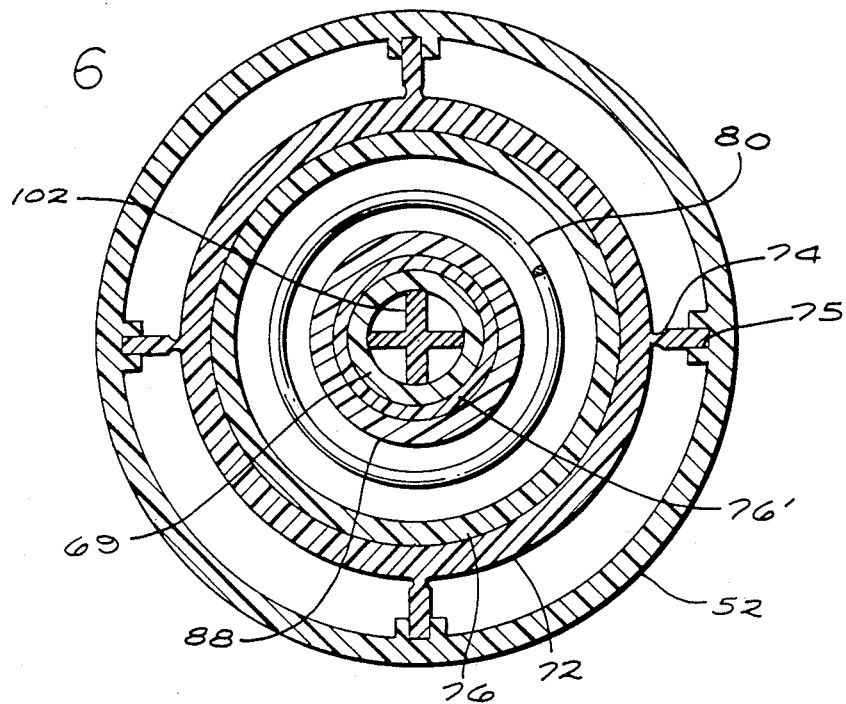
FIG. 6 is a horizontal sectional view taken generally on the line 6—6 of FIG. 5.

The shuttle valve assembly 42 further includes a lower, generally cup shaped and upwardly open cylinder 72 supported within the upper housing 52 for vertical reciprocation toward and away from the valve plate 66. Radially outwardly projecting keys 74 on the cylinder project into vertically elongated slots 75 (FIGS. 5 and 6) in the upper housing 52 to lock the cylinder 72 against rotation within the housing 52, while permitting relatively unrestrained axial or vertical sliding motion. The lower end of these slots 75 are closed to defined stops preventing cylinder removal from the housing 52.

Figure 7:
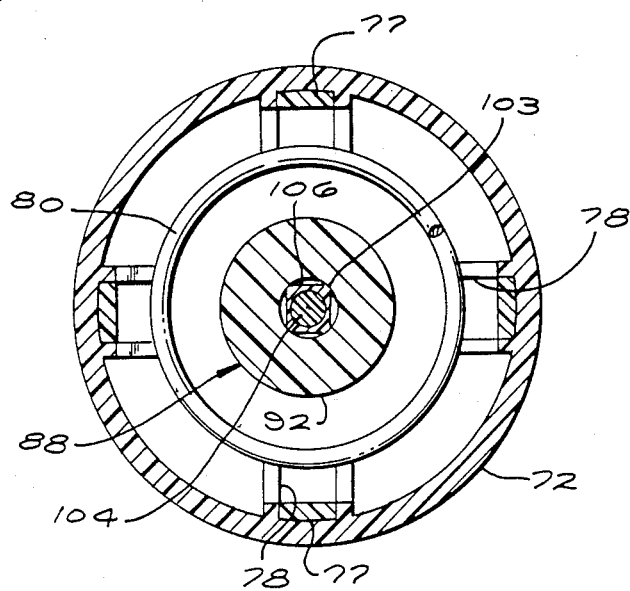
FIG. 7 is a horizontal sectional view taken generally on the line 7—7 of FIG. 5.

A piston 76 is carried in turn within the cylinder 72 for vertical reciprocation, with the piston 76 including a central guide sleeve 76' sliding over the central guide tube 69 of the housing 52. Outer downwardly projecting legs 77 on the piston 76 (FIGS. 3, 5 and 7) are guided within cylinder tracks 78 to prevent relative rotation between the cylinder 72 and piston 76. A helical compression spring 80 reacts between the cylinder 72 and the piston 76 to urge those components in opposite vertical directions.

The upper margins of the cylinder 72 and the piston 76 respectively include annular sets of upwardly projecting ratchet-type or drive teeth 82 and 84 for engaging a corresponding annular set of downwardly projecting ratchet-type and relatively radially enlarged driven teeth 86 on the valve plate 66. Importantly, the sets of teeth 82 and 84 on the cylinder 72 and piston 76 have common geometries and are provided in a common number to include ramped leading edges and generally vertically oriented trailing edges for meshing with the generally vertical leading edges and ramped trailing edges of the driven teeth 86. However, while the sets of drive teeth 82 and 84 are provided in common numbers, these sets of teeth are rotationally constrained with the teeth disposed one-half tooth out of phase when the piston legs 77 are received within the cylinder tracks 78. Accordingly, the two sets of drive teeth 82 and 84 cannot fully engage the driven teeth 86 at the same time.

A generally sleeve-shaped shuttle valve 88 is carried within the cylinder 72 at a position underlying the piston 76 and functions to control the pressure within various chambers of the shuttle valve assembly 42. The shuttle valve 88 allows certain pressures to build and be relieved in a manner causing the piston and cylinder to reciprocate in mutually opposite directions and in a regular timed fashion to index the valve plate 66 in a stepwise manner. Such valve plate rotation, as previously described, ports steam from within the kettle body 14 to the overlying steam whistles for playing the selected tune.

As shown best in FIGS. 5 and 12-15, the shuttle valve 88 has a generally sleeve-shaped or cylindrical upper region 88' having an open upper end for sliding reception onto the lower end of the central guide tube 69 on the upper housing 52. The axially upper end of the shuttle valve 88 is sized and shaped to contact the underside of the piston 76 during certain operating conditions to restrict steam passage through piston ports 90 formed in the piston 76. The lower end of the cylindrical shuttle valve portion 88' blends into an end wall 92 having a central bore 94 formed therein. A sleeve like extension 96 of reduced diametric size protrudes downwardly a short distance below the end wall 94 and terminates in a radially narrow seal ridge 98. A resilient seal washer 100 is mounted at the lower end of the shuttle valve 88 in a position surrounding the seal ridge 98 for substantially sealed contact with a bottom wall 72' of the cylinder 72 during certain operating conditions. An annular retaining ring 101 is conveniently provided for securing the seal washer 100 onto the shuttle valve.

The central bore 94 in the shuttle valve end wall 92 provides a regulated exit port for discharge passage of steam under pressure from various portions of the shuttle valve assembly 42, as will be described in more detail. Such exit port regulation is obtained by use of an exit port stem member 102 having an upper X-shaped support 102' and lower snap feet 102" for appropriate snap fit mounting or the like within the interior of the central guide tube 69 of the housing 52. This stem member 102 includes a lower hollow stem 103 received over a lower guide post 104 on the cylinder 72. The lowermost end of this stem member 103 includes an external cylindrical seal surface 105 for substantially sealed fit into the shuttle valve bore 94. Above the seal surface 105, the stem 103 includes a plurality of external recesses or flats 106 which permit steam passage upwardly through the shuttle valve bore 94 when the lower seal surface 105 is not received within the bore 94. An exit port cap 108 is conveniently mounted on the topside of the upper housing 52 above the stem member 102 and is seated within an escape port 109 formed in the upper housing. This cap 108 is vented to permit steam escape from within the kettle, and in accordance with shuttle valve operation.

In operation of the shuttle valve assembly 42, the cylinder 72 is in an initial rest position with the cylinder keys 74 resting at the bottoms of the housing slots 75, and with the cylinder teeth 82 disengaged from the valve plate teeth due to the action of the spring 80. In this initial position, the compression spring 80 reacts between the piston 76 and the cylinder 72 to urge the piston upwardly toward full ratchet tooth engagement with the driven teeth 86 on the valve plate 66.

As steam pressure builds within the kettle body when water therein is boiled, the rising steam pressure leaks past the engaged teeth into upper chamber 110 above the piston 76 and further through the piston ports 90 into a lower spring chamber 112 below the piston. Further pressure leakage to atmosphere past the flats 106 on the stem member 102 is permitted, but this leaks sufficiently slowly to create a pressure gradient along this leakage path. As a result, the pressure in the lower chamber 112 rises sufficiently and acts against the lower face of the shuttle valve 88 to pop the shuttle valve upwardly to a position with its upper margin obstructing the piston ports.

Further steam pressure increase within the kettle body acts upwardly against the cylinder 72 and eventually overcomes the biasing force of the compression spring 80 to lift the cylinder. The set of drive teeth 82 on the cylinder 72 are carried by the pressure-induced upward cylinder motion into landed engagement with the driven teeth 86 on the valve plate. However, when the drive teeth 84 on the piston 76 are fully engaged with the valve plate teeth 86, the drive teeth 82 on the cylinder 72 can advance only into half-tooth engagement with the valve plate teeth 86 due to the one-half tooth misalignment between the sets of drive teeth 82 and 84.

Figure 9:
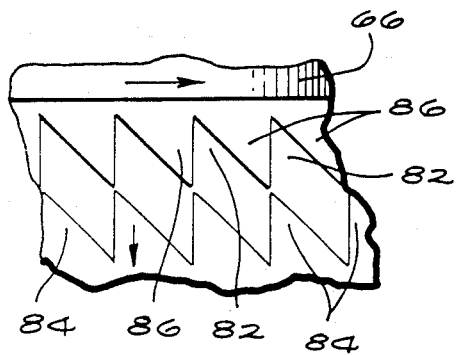
FIG. 9 is an enlarged fragmented vertical sectional view taken generally on the line 9—9 of FIG. 5 and showing full engagement between a drive cylinder and a rotatable valve plate of the shuttle valve assembly.

When the cylinder drive teeth 82 land in half-engagement with the driven teeth 86 on the valve plate, further upward motion of the cylinder 72 due to still-building kettle pressure is prevented temporarily by the nonrotational interlock between the piston and cylinder. Instead, further kettle pressure increases now act downwardly upon the topside of the piston 76 as a result of steam at kettle pressure leaking past the sets of teeth and into the upper pressure chamber 110 located above the piston 76. This steam action displaces the piston 76 in a downward direction against the compression spring 80, with the cylinder 72 remaining stationery until the drive teeth 84 on the piston translate vertically out of engagement with the valve plate teeth. At the instant of such piston tooth disengagement, the cylinder 72 is no longer locked against advancement into full meshed engagement with the valve plate teeth 86 in response to the combined effects of kettle pressure and the compression spring 80. Therefore, due to the tooth misalignment between the piston 76 and cylinder 72, such full engagement by the cylinder teeth is accompanied by valve plate rotation or advancement through a one-half tooth rotational increment. This position of the piston 76 and cylinder 72 relative to the valve plate 66 is shown in detail in FIGS. 5 and 9.

Figure 10:
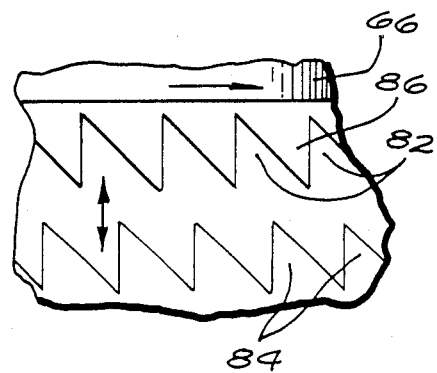
FIGS. 10—13 are enlarged fragmented sectional view a similar to FIG. 9 but showing sequential engagement and disengagement of the drive cylinder and a drive piston relative to the valve plate.

Downward movement of the piston 76 within the cylinder 72 continues due to the building steam pressure within the upper chamber 110. The downwardly moving piston 76 pushes against the axially upper end of the shuttle valve 88 to carry the shuttle valve with it in a direction away from the valve plate 66. Downward piston movement is halted when the resilient seal washer 100 at the axially lower end of the shuttle valve 88 lands upon the cylinder bottom wall 72', as viewed in FIGS. 10 and 14. In this position, the shuttle valve seal washer 100 seals the lower spring or pressure chamber 112 underlying the piston 76 against communication with the exit port bore 94. Accordingly, slow pressure leakage past the piston ports 90 into the lower pressure chamber 112 permits the pressure within the chamber 112 to increase. Eventually, after a short time delay, the pressure in the lower chamber 112 will increase to a level where it allows the spring 80 to return the piston 76 in an upward direction.

Figure 15:
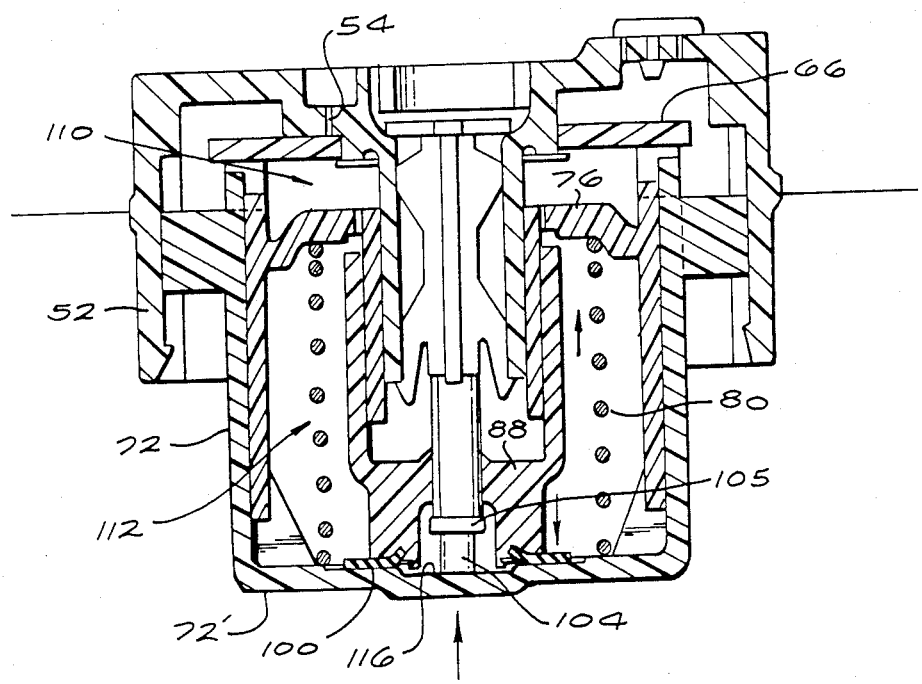

As the piston 76 translates upwardly, as viewed in FIG. 15, the drive teeth on the piston are displaced into half-engagement with the valve plate teeth 86. Further upward piston motion is temporarily prevented due to the nonrotational interlock between the piston and cylinder. Importantly, upward piston motion is not accompanied by the shuttle valve 88 which remains locked against the bottom wall 72' of the cylinder 72 by virtue of the pressure within the chamber 112 acting downwardly against the radially enlarged seal washer 100.

Figure 11:
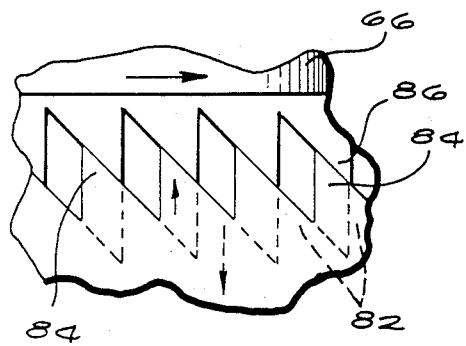
Figure 12:
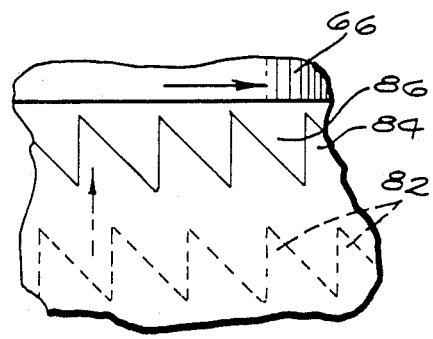

With the piston teeth 84 in half-engagement with the valve plate teeth 86, continued pressure build-up within the lower pressure chamber 112 cooperates with the spring 80 to initiate downward cylinder motion, as shown in FIG. 11. This downward cylinder translation retracts the cylinder drive teeth 82 from the valve plate teeth 86. When the drive teeth 82 disengage from the valve plate, the spring 80 forces the now-released piston 76 to advance upwardly for full engagement of the piston drive teeth 84 with the valve plate teeth 86. Such full engagement is accompanied, of course, by another half-tooth index advancement of the valve plate.

Figure 8:
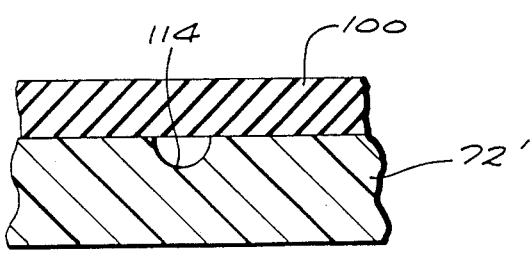
FIG. 8 is an enlarged fragmented vertical sectional view taken generally on the line 8—8 of FIG. 5.
Figure 13:
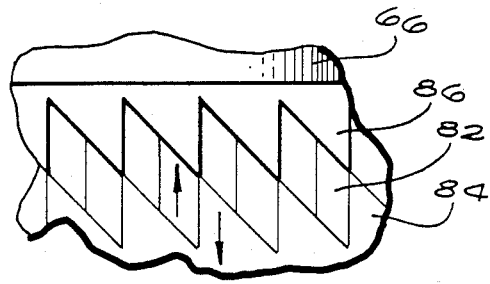
Figure 14:
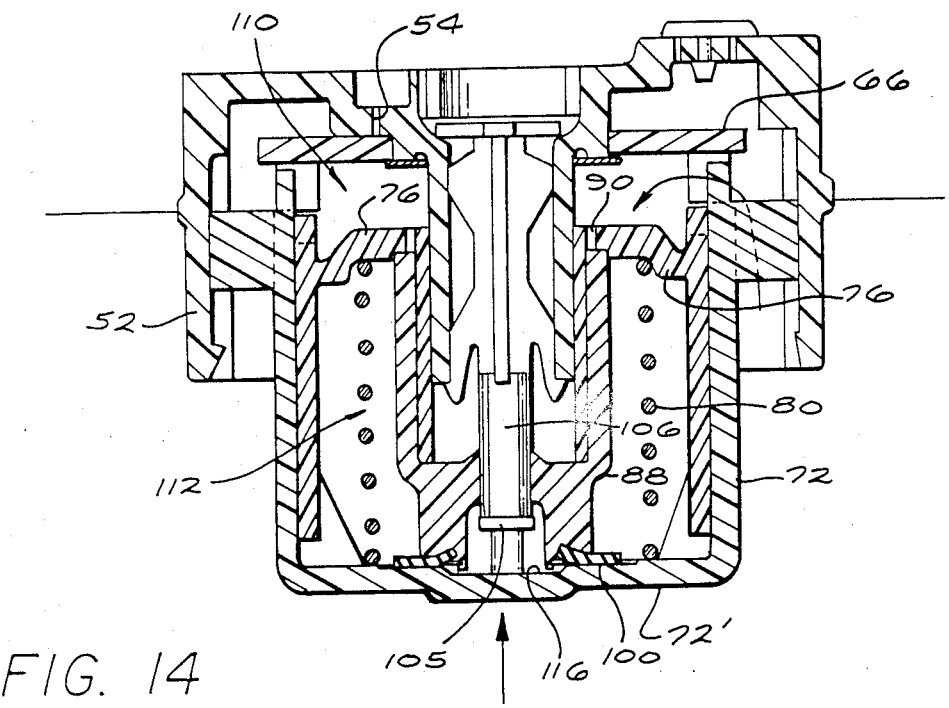
FIGS. 14-17 are enlarged fragmented vertical sectional views similar to FIG. 5 but depicting operation of the shuttle valve assembly in correlation with the drive piston and cylinder positions shown respectively in FIGS. 10-13.
Figure 16:
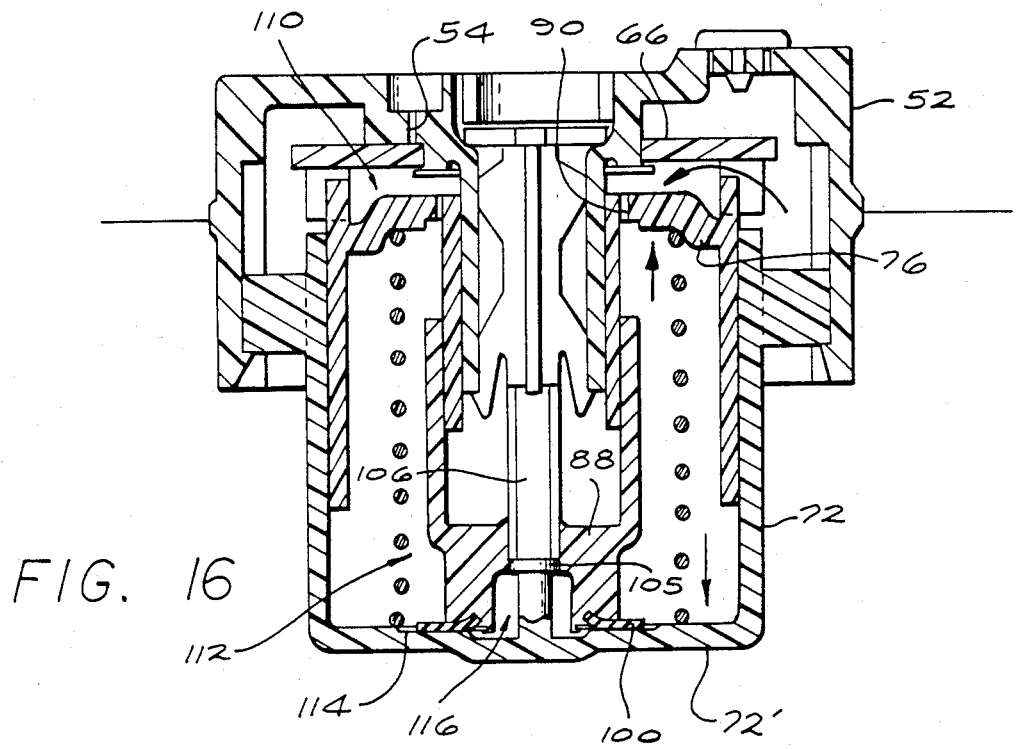
Figure 17:
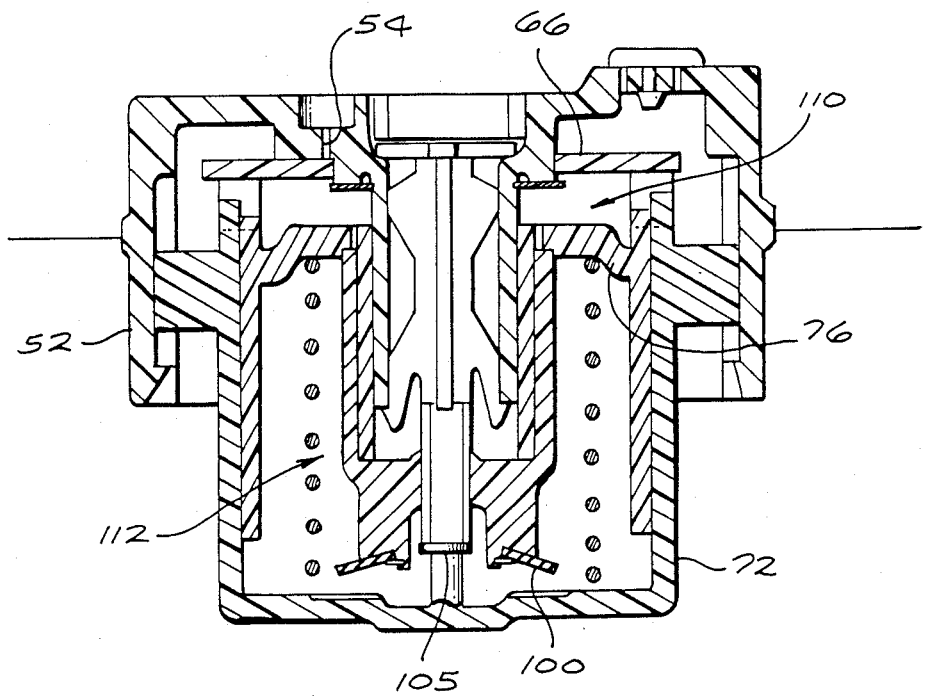

The spring 80 continues to cooperate with the pressure build-up in the lower chamber 112 to translate cylinder 72 downwardly relative to the fully engaged piston 76. At a lowermost translation point, as viewed in FIGS. 12 and 16, the circular lower seal surface 105 on the exit port stem 103 is drawn into the shuttle valve exit port 94 to prevent or halt steam escape past the stem flats 106 previously positioned within the bore 94. This sealing action permits pressure leakage through a groove 114 in the cylinder bottom wall 72' beneath the seal washer 100 (FIG. 8). Pressure leakage through the groove 114 causes pressure build-up within a small control chamber 116 at the underside of the shuttle valve end wall 92. Sufficient pressure increase in this control chamber 116 effectively exposes the entire lower face of the shuttle valve 88 to the steam pressure thereby causing the shuttle valve 88 to pop upwardly from the cylinder bottom wall 72'. When this occurs, the pressure within the lower chamber 112 is relieved such that kettle pressure returns the cylinder 72 through an upward stroke toward half-engagement with the valve plate teeth 86, followed in turn by downward piston displacement in response to pressure build-up in the upper chamber 110, as previously described, and as shown in FIGS. 13 and 17.

Accordingly, the generated steam within the kettle translates the piston and cylinder back and forth with a succession of motions designed to rotate the valve plate 66 through half-tooth increments, and in a regular timed sequence. This rotation moves the valve ports 68 beneath the steam ports 54 to supply steam to the steam whistles and play the selected tune. In working embodiments of the invention, kettle pressures of about one-half psi are effective to operate the shuttle valve assembly 42 and to operate the steam whistles in a reliable manner. Umbrella-type relief valves 120 may be provided over bleed ports 122 in the upper housing 52 to prevent excessive kettle pressures, if desired.

A variety of modifications and improvements to the musical tea kettle described herein will be apparent to those skilled in the art. Accordingly, no limitation on the invention is intended by way of the foregoing description and accompanying drawings, except by way of the appended claims.

What is claimed is:

1. A musical tea kettle, comprising:
   a kettle body adapted for receiving a supply of water to be heated to a boiling condition to generate steam, said kettle body having an upper opening formed therein; and
   a whistle unit mounted on said kettle body in a position generally closing said opening, said whistle unit including a plurality of steam whistles and means for supplying steam generated within said kettle body to said steam whistles in a timed, regulated pattern to play a selected tune.

2. The musical tea kettle of claim 1 further including means supporting said whistle unit for movement between a first position substantially closing said kettle body opening and a second position permitting water passage through said opening.

3. The musical tea kettle of claim 2 wherein said whistle unit includes seal means for substantially sealed engagement with said kettle body when said whistle unit is in said first position.

4. The musical tea kettle of claim 1 further including a handle assembly mounted on said kettle body, said handle assembly having a handle member adapted for manual manipulation of the tea kettle, a lever pivotally supported on said handle member and carrying said whistle unit for movement between a first position substantially closing said kettle body opening and a second position permitting water passage through said opening, and spring means for biasing said lever toward a normal position supporting said whistle unit in said first position.

5. The musical tea kettle of claim 1 wherein said whistle unit includes a movable valve member for supplying steam generated within said kettle body to said steam whistles, and steam driven valve means for moving said valve member in a manner supplying the generated steam to the steam whistles in the timed, regulated pattern.

6. The musical tea kettle of claim 1 further including relief valve means for preventing steam pressure increase within said kettle body beyond a predetermined limit.

7. The musical tea kettle of claim 1 wherein said steam whistles include a respective plurality of pitch pipes each angularly inclined to drain condensate therefrom and thereby prevent condensate interference with steam whistle operation.

8. The musical tea kettle of claim 1 wherein said whistle unit comprises a housing mounted generally within said kettle body opening, said plurality of steam whistles being mounted generally at the topside of said housing, said housing having a plurality of steam ports formed therein in respective communication with said steam whistles, a valve plate rotatably supported at the underside of said housing and having a pattern of valve ports formed therein for permitting steam passage from within said kettle body to said steam ports when said valve ports are aligned with said steam ports, and steam powered drive means supported at the underside of said housing for rotatably driving said valve plate.

9. The musical tea kettle of claim 8 wherein said housing has a generally inverted, cup-shaped geometry.

10. The musical tea kettle of claim 8 wherein steam powered drive means comprises ratchet drive means for rotating said valve plate in a succession of small rotational steps.

11. The musical tea kettle of claim 8 wherein said valve plate has an annularly arranged set of driven teeth formed thereon, said steam powered drive means comprising a drive cylinder having an annularly arranged set of first drive teeth formed thereon for meshing with said driven teeth, a drive piston having an annularly arranged set of second drive teeth formed thereon for meshing with said driven teeth, means for maintaining said first and second sets of drive teeth in misalignment substantially one-half tooth out of phase, means for supporting said piston and cylinder for reciprocation with respect to each other and toward and away from said valve plate, and shuttle valve means for subjecting said piston and cylinder to a timed sequence of differential pressures for reciprocating said piston and cylinder respectively in opposite directions toward and away from said valve plate for rotatably driving said valve plate in a succession of half-tooth increments.

12. The musical tea kettle of claim 11 wherein said first and second sets of teeth have ramped leading edges and generally vertical trailing edges aligned substantially with the direction of piston and cylinder reciprocation, said driven teeth having generally vertical leading edges and ramped trailing edges.

13. The musical tea kettle of claim 11 wherein said shuttle valve means includes means for subjecting said piston to steam pressure within said kettle body to displace said piston away from said valve plate when said first teeth on said cylinder are meshed with said driven teeth on said valve plate, means for normalizing pressure across said piston when said piston reaches a maximum stroke displaced away from said valve plate, a spring member for urging said piston to return in a direction toward said valve plate to land said second teeth in partial meshed engagement with said driven teeth, means for applying steam pressure within said kettle body to urge said cylinder away from said valve plate such that said first teeth disengage from said driven teeth to permit said second teeth to more fully engage said driven teeth, and means for altering the steam pressure applied to said cylinder to return said cylinder toward said valve plate to land said first teeth in partial meshed engagement with said driven teeth whereupon said subjecting means subjects said piston to said steam pressure to displace said piston again in a direction away from said valve plate such that said second teeth disengage from said driven teeth to permit said first teeth to more fully engage said driven teeth, whereby said valve plate in indexed rotationally in half-tooth increments upon said first teeth and said second teeth more fully engaging said driven teeth.

14. A musical tea kettle, comprising:
   a kettle body adapted for receiving a supply of water to be heated to a boiling condition to generate steam, said kettle body having an upper opening formed therein; and
   a handle assembly mounted on said kettle body for manual handling of the tea kettle, said handle assembly including a whistle unit supported in a position generally closing said opening, said whistle unit including a plurality of steam whistles and means for supplying steam generated within said kettle body to said steam whistles in a timed, regulated pattern to play a selected tune;
   said handle assembly including means for moving said whistle unit between a first position substantially closing said opening and a second position permitting water passage through said opening.

15. The musical tea kettle of claim 14 wherein said whistle unit includes steam powered drive means for supplying steam generated within said kettle body to said steam whistles in the timed, regulated pattern.

16. A musical tea kettle, comprising:
 a kettle body adapted for receiving a supply of water to be heated to a boiling condition to generate steam, said kettle body having an upper opening formed therein;
 a housing mounted generally within said kettle body opening, said housing having a plurality of steam ports and an exit port formed therein;
 a plurality of steam whistles mounted at the topside of said housing in respective communication with said steam ports;
 a valve plate rotatably mounted at the underside of said housing and having a plurality of valve ports formed therein for rotation in a predetermined sequence into alignment with said steam ports, said valve plate including a generally annular set of downwardly projecting driven teeth;
 a generally cup-shaped cylinder supported in an upwardly open position within said housing for reciprocation along a generally vertical axis through a limited stroke toward and away from said valve plate;
 means for preventing relative rotation between said housing and said cylinder;
 an annular set of first drive teeth on said cylinder for meshed engagement with said driven teeth;
 a piston supported within said cylinder for reciprocation generally along said vertical axis through a limited stroke toward and away from said valve plate;
 spring means reacting between said piston and cylinder to urge said piston toward said valve plate and to urge said cylinder away from said valve plate;
 an annular set of second drive teeth on said piston for meshed engagement with said driven teeth;
 means for preventing relative rotation between said piston and said cylinder, and for retaining said piston in an orientation with said second drive teeth disposed one-half tooth out of phase relative to said first drive teeth; and
 a generally sleeve-shaped shuttle valve for variably applying steam pressure generated within said kettle body to said piston and cylinder to reciprocate said piston and cylinder in opposite directions along said vertical axis such that said first and second drive teeth engage and disengage said driven teeth in sequence to rotate said valve plate in half-tooth increments.

17. The musical tea kettle of claim 16 further including relief valve means for limiting steam pressure within said kettle body to a predetermined limit.

18. The musical tea kettle of claim 16 wherein said steam whistles includes individual pitch pipes mounted at inclined angles to drain condensate therefrom.

19. The musical tea kettle of claim 16 further including a handle assembly including a handle member mounted on said kettle body, and means for supporting said housing for movement between a first position substantially closing said kettle body opening and a second position permitting water passage through said opening.

20. The musical tea kettle of claim 16 wherein said first and second drive teeth have ramped leading edges and generally vertically oriented trailing edges, said driven teeth having generally vertically oriented leading edges and ramped trailing edges.

21. The musical tea kettle of claim 16 wherein said piston includes a central depending guide tube, said shuttle valve being slidably carried about said guide tube and supporting an annular seal washer at the lower end thereof, the inner diameter of said shuttle valve communicating with said exit port, and further including an exit port obstructer for cooperating with said shuttle valve to close said exit port when said shuttle valve is in a lowermost position sliding along said guide tube and to open said exit port when said shuttle valve is above said lowermost position.

* * * * *